United States Patent
Roper

[15] 3,658,387
[45] Apr. 25, 1972

[54] THERMALLY ACTIVATED POWER BRAKE SYSTEM AND PUMP THEREFOR

[72] Inventor: John Roper, 1325 Eutaw Place, Baltimore, Md. 21217

[22] Filed: Dec. 9, 1970

[21] Appl. No.: 96,538

Related U.S. Application Data

[63] Continuation-in-part of Ser. No. 79,586, Oct. 9, 1970, abandoned.

[52] U.S. Cl. ..........................303/10, 60/1, 188/152, 417/403, 91/271
[51] Int. Cl. ..........................................................B60t 13/16
[58] Field of Search ..............417/403; 60/36, 1; 91/265, 91/271; 303/10; 188/355, 152

[56] References Cited

UNITED STATES PATENTS

| | | | |
|---|---|---|---|
| 709,124 | 3/1902 | Unser | 188/355 |
| 2,933,043 | 4/1960 | Furrer | 417/403 X |
| 3,274,899 | 9/1966 | Stump | 91/265 |
| 3,329,133 | 7/1967 | Panhard | 417/403 X |
| 3,479,817 | 11/1969 | Minto | 60/36 |
| 3,101,588 | 8/1963 | Perry | 60/31 |
| 3,101,599 | 8/1963 | Pippert et al. | 62/238 |

FOREIGN PATENTS OR APPLICATIONS

| | | | |
|---|---|---|---|
| 6,724 | 7/1899 | Great Britain | 188/355 |

Primary Examiner—Edgar W. Geoghegan
Assistant Examiner—Allen M. Ostrager
Attorney—Arthur Schwartz

[57] ABSTRACT

A power brake system for vehicles wherein thermal energy from the exhaust of the engine of a vehicle is converted into mechanical energy which is used to apply the brakes of the vehicle. In the system, working fluid in the liquid phase is changed to high energy vapor by exhaust heat from the engine. The high energy vapor is expanded in brake motors to produce mechanical braking energy. The system includes a feed pump for the liquid working fluid which is driven by the high energy vapor of the system. The pumping apparatus and the pump driving apparatus are both contained in a single, totally enclosed, sealed housing.

12 Claims, 4 Drawing Figures

INVENTOR
JOHN H. ROPER

BY *Arthur Schwartz*
ATTORNEY

THERMALLY ACTIVATED POWER BRAKE SYSTEM AND PUMP THEREFOR

CROSS-REFERENCE TO RELATED APPLICATIONS

This application is a continuation-in-part of the copending application of John H. Roper, Ser. No. 79,586 filed Oct. 9, 1970, titled "Thermally Activated Power Brake System," now abandoned.

BACKGROUND AND OBJECTS OF THE INVENTION

In heavy duty braking applications the use of compressed air for powering the brakes of a vehicle has long been known. In these applications, high pressure air is supplied by an air compressor driven by the engine of the vehicle. One disadvantage of such an air brake system is the loss of available engine power which results when power is diverted to drive the compressor.

Another problem associated with the use of an air compressor in a power brake system is the inevitable leakage of lubricating oil from the compressor into the air system, this being a major cause of malfunctions.

Conventional air brake systems have a further disadvantage in that moisture present in the compressed air may condense and freeze on cold days, rendering the valves of the systems inoperative and causing brake failures.

An additional disadvantage is the tendency of dust and dirt to collect in the system, creating a maintenance problem and further contributing to the chances of a brake failure.

A further disadvantage of the present air brake systems is the practical limitation on the air compressor's pressure range and volume. In heavy duty braking systems, the drum and brake shoe are giving way to the disk type brake due to advantages which the latter has in initial cost, maintenance requirements, weight and other factors. A problem associated with the use of the disk type brake, however, is that it requires a motive fluid pressure and volume beyond the range of the conventional vehicle air compressor.

It is therefore a primary object of the present invention to provide a braking system which overcomes the above-mentioned disadvantages and limitations of conventional braking systems.

It is another object to provide a braking system wherein a high pressure gas is generated from the waste exhaust heat of the engine of a vehicle, thereby eliminating the conventional air compressor. Thus, the engine power consumption associated with the compressor is eliminated and an increased economy of operation is made possible.

It is another object to provide a brake system using pressurized gas wherein the motive fluid is completely free of lubricating oils, thus eliminating a major cause of brake system malfunctioning.

It is yet another object of the present invention to provide a braking system using pressurized gas in a hermetically sealed, closed-loop fluid circuit to prevent the collection of dust, dirt, or water from the system.

Another object is to provide a braking system with a means for generating greater volumes of gas at higher pressures than can be attained by conventional vehicle air compressors.

It is yet another object of the invention to provide a method and means for obtaining useful work from the waste heat of an engine by vaporizing, expanding, and liquefying a working fluid.

It is another object to provide a brake system which uses a refrigerant as a working fluid.

It is a more particular object to provide a fluorinated hydrocarbon sold under the trademark "Freon" as a working fluid for a brake system.

It has been proposed to use "Freon" as a working fluid in power systems which produce useful work from heat energy. The "Freon" fluids have an advantage over the more commonly known working fluids, such as steam, in that the former have freezing temperatures well below the lowest ambient temperatures to which the equipment will be subject. Also the "Freon" fluids have relatively low boiling points, critical temperatures and critical pressures compared with steam, these properties permitting an efficient use of engine heat with equipment having relatively less weight, strength, and size.

One problem associated with the use of "Freon" in power systems has been the tendency of the "Freon" to chemically decompose when heat is applied thereto. It has been discovered that the presence of even very minute traces of contaminants, particularly lubricating oils, in the "Freon" working fluid drastically reduces the maximum temperature to which the fluid can be heated without chemical breakdown.

To insure that absolutely no trace of lubricating oil enters the fluid stream of a "Freon" power system, it would be highly desirable to provide a feed pump for the system which uses no lubricant. To further ensure against the possibilities of introducing lubricants or other contaminants into the system it would also be desirable to have both the pump itself and the pump driving elements contained within a single, totally enclosed housing. This is important because, with separate pumping and pump driving elements, it would be necessary to provide a linkage means between the two. An imperfect sealing of the linkage means would greatly increase the chances of introducing contaminants into the fluid stream.

It is accordingly an object of the present invention to provide a feed pump for a "Freon" power system which requires no lubricant.

It is a further object of the present invention to provide a feed pump for a "Freon" power system which incorporates the pumping apparatus and the pump driving apparatus in a single, totally enclosed housing.

It is a further object of the invention to provide a totally enclosed, non-lubricated feed pump which is capable of withstanding the high temperatures and pressures of a "Freon" power system and capable of supplying the volumes of fluid required by such a system.

Various other objects, advantages, features and results of the invention which will be apparent to those skilled in the art, may be achieved with the exemplary embodiments of the invention described in detail hereinafter and illustrated in the accompanying drawings.

SUMMARY OF THE INVENTION

This invention is directed to a system for converting the waste heat of the engine of a vehicle into useful mechanical energy for use in the vehicle. In particular, exhaust heat from the engine of a vehicle is converted into mechanical energy for applying the brakes of the vehicle.

The system includes a boiler which receives high pressure working fluid, preferably a fluorinated hydrocarbon sold under the trademark "Freon." In the boiler the liquid passes through coils and is vaporized by heat from exhaust gases directed over the outside of the coils. The heated vapor passes through a pressureline into a reservoir where it is accumulated and stored for future work.

From the reservoir the heated vapor is fed to a brake valve which is actuated by the foot pedal. The brake valve distributes the heated vapor through brake lines to the motors of the individual wheel brakes. The vapor is expanded in the wheel brake motors to produce mechanical energy for applying the brakes.

After expansion in the brake motors has taken place, the vapor flows back through the brake valve and into an air cooled condenser. The fluid is liquefied in the condenser, and directed to the feed pump where it is pressurized. The pressurized liquid is fed back into the boiler and the cycle is repeated.

The feed pump is a totally enclosed unit which is driven by pressurized, heated vapor from the system. Both the pump driving apparatus and the pumping apparatus are enclosed in a single housing. The side of the feed pump which contains the pump driving apparatus is referred to as the motor side, whereas the other side, which contains the pumping apparatus, is referred to as the pump side.

Vapor from the reservoir is directed to the motor side of the feed pump and is expanded therein to affect reciprocating of a piston. The piston is connected to a rod which extends into the pump side and attaches to a plunger therein. Thus the reciprocating movement of the piston in the motor side will be transferred by the rod to the plunger. The reciporcating plunger pumps liquid working fluid through inlet and outlet check valves in the pump side and delivers the liquid to the boiler of the system.

In the motor side of the feed pump, a pair of generally annularly shaped cam members are disposed about the rod. Annular shoulders on the rod engage the cam members as the rod nears the end of each stroke. The cams are moved a slight distance along with the rod, this cam movement actuating inlet and exhaust valves in the motor side. Actuation of the valves effects reversal of the piston, to maintain reciprocating movement of the piston, rod and plunger.

DETAILED DESCRIPTION OF THE PREFERRED EMBODIMENT

Figure 1:
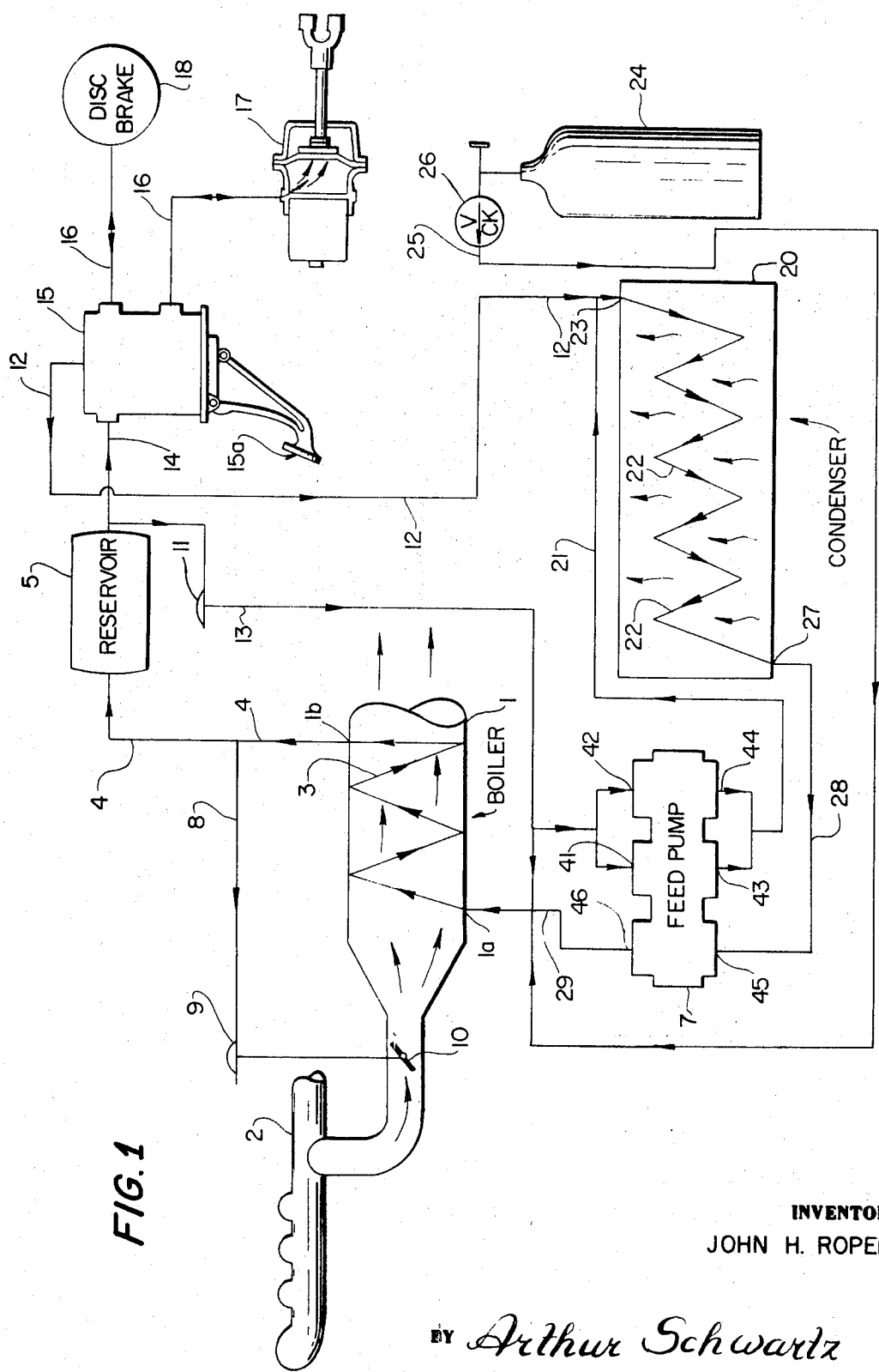
FIG. 1 is a schematic diagram of one form of brake system according to the invention.

FIG. 1 is a schematic diagram showing a vehicle braking system which includes a boiler 1 into which hot gases from an engine exhaust pipe 2 are directed. A coil of boiler tubing 3 disposed within the boiler 1 extends between a boiler inlet 1a and a boiler outlet 1b. Connected to the boiler outlet 1b is a pressure line 4 which leads to a reservoir 5. A temperature control branch 8 connects the pressure line 4 with a temperature control valve 9 which operates an exhaust flow restrictor 10.

A gas line 14 extends from the reservoir 5 to a brake valve 15 which is actuated by a conventional foot pedal 15a.

A pressure branch 13, connects gas line 14 with gas inlet ports 41, 42 of a feed pump 7. Interposed in the pressure branch 13, is a pressure control valve 11.

A plurality of brake lines 16 communicate with the brake valve 15. Each brake line 16 communicates with a brake motor 17 which actuates a disc brake 18. The condenser return line 12 connects the brake valve 15 with a condenser 20. A return conduit 21 connects gas exhaust ports 43, 44 of the feed pump 7 with a condenser return line 12.

The condenser return line 12 is connected with the condenser 20 at the condenser inlet 23. A coil of condenser tubing 22 extends between the condenser inlet 23 and a condenser outlet 27. A pump return line 28 connects condenser outlet 27 with a liquid inlet port 45 of the feed pump 7. Extending from a liquid outlet port 46 of the feed pump 7 to the boiler inlet 1a is a boiler feed line 29.

OPERATION OF THE SYSTEM

In operation the system converts the thermal energy from the waste heat of the engine of a vehicle into mechanical energy for braking. Preferably this is accomplished by passing hot gases from the engine over the coils 3 of the boiler. Various other arrangements, however, such as obtaining heat from the cooling system of the engine of a vehicle would be possible.

Working fluid, in the liquid phase, enters the boiler inlet 1a and flows into the boiler coil 3. Fluid in the coil 3 is vaporized by heat from the exhaust gases which pass over the outside of the coil 3. The heated vapor passes through the boiler outlet 1b and into the pressure line 4. The same vapor flows from the pressure line 4 into the reservoir 5 where it is collected. From the reservoir the vapor is directed through the gas line 14 and into the brake valve 15. When the foot pedal 15a is depressed by the operator, the brake valve is opened so as to allow the heated vapor to pass through the valve 15 and into the brake lines 16.

Each brake line 16 directs the heated vapor to a diaphragm brake motor 17. In the brake motor 17 the heated vapor is expanded to produce mechanical energy which is applied to a disc brake 18 of the vehicle.

When the brake pedal 15a is released, the brake valve 15 closes communication between the gas line 14 and the brake lines 16, and at the same time, opens communication between the brake lines 16 and the condenser return line 12. The vapor which has been expanded in the brake motor 17 may return through the brake lines 16 and pass back through the brake valve 15. From the brake valve 15, the expanded vapor passes into the condenser return line 12.

The condenser return line 12 directs the expanded vapor to the condenser inlet 23, and from there into the coil 22 of the condenser 20. Air at ambient temperature passes over the condenser coil 22 to liquefy the expanded vapor.

The condensed liquid is directed from the condenser coil 22 to the condenser outlet 27. From here, the condensate flows to the liquid inlet port 45 of the feed pump 7 via the pump return line 28. The feed pump 7 raises the pressure of the consensate and directs the pressurized liquid to the boiler inlet 1a via the boiler feed line 29. When the pressurized liquid reaches the boiler 1, the above cycle is repeated.

The system includes a supply tank 24 to furnish an original charge of energized fluid to the system at start up. The fluid in the supply tank 24 also serves as an emergency supply, to ensure that the braking system will always have a sufficient quantity of working fluid available. When fluid is needed it is directed from the supply tank 24 through the check valve 26 and along the supply line 25 into the boiler feed line 29.

TEMPERATURE REGULATION

The system is regulated by a temperature control valve 9 which operates a flow restrictor 10. The temperature control valve 9 receives heated vapor from the boiler via pressure line 4 and temperature control branch 8. In response to the temperature of the heated vapor, the temperature control valve 9 will operate the flow restrictor 10. The flow restrictor 10 controls the rate of flow of exhaust gases into the boiler 1 to maintain the temperatures of the heated vapors exiting from the boiler 1 substantially constant.

FUNCTION OF THE FEED PUMP

The function of the feed pump 7 is to raise the pressure of the condensate, to deliver this pressurized liquid to the boiler and to maintain the circulation of fluid in the system. The feed pump 7 is driven by heated vapor from the system. Both the pump driving elements and the pumping elements per se are included in a single, totally enclosed, hermetically sealed housing.

Heated vapor from the reservoir 5 passes into gas line 4 and enters the pressure branch 13. The pressure branch 13 directs the heated vapor to the gas inlet ports 41, 42 of the feed pump 7. In the feed pump 7 the heated vapor is expanded to produce work energy for pumping the working fluid. The expanded vapor leaves the feed pump 7 through the gas outlet ports 43, 44 and is directed to the condenser return line 12 by a return conduit 21. Thus, the vapor which has been expanded to drive the pump joins the expanded vapor from the brake motor in the condenser return line 12.

PRESSURE REGULATION

The pressure of the working fluid in the system is maintained substantially constant by the pressure control valve 11. Heated vapors from the gas line 14 enter the pressure control valve 11 through the pressure branch 13. When the pressure control valve 11 is open, the vapors continue through the pressure branch and pass into the gas inlet ports 42, 43 of the feed pump 7.

Although the pressure control valve 11 is normally open, it will begin to close if the pressure of the heated vapors exceeds the desired upper limit. This will inhibit the flow of high energy vapor to the feed pump 7 and cause the pump to be driven at a slower rate. Thus the delivery pressure of the liquid being pumped will decrease, effecting a corresponding decrease in the entire system pressure. Therefore, the pressure of the heated vapor in the reservoir 5 will decrease, the pressure control valve 11 will open again, and the operation of the system will be restored to normal.

As described above, the temperature and pressure of the heated vapor is regulated and maintained constant by control valves 9, 11. Because the pump is driven by this regulated fluid, it will operate, on an overall basis, at a substantially constant speed with a nearly uniform output rate. The pump will thus maintain the working fluid at a predetermined energy level so that a given amount of energy will always be available for performing work regardless of system radiation losses.

WORKING FLUID FOR THE SYSTEM

While a large variety of working fluids might be successfully employed in the braking system of the present invention, the fluids commonly used in refrigeration cycles have been found to be particularly well suited for this application. The refrigerant gases are advantageous in that their freezing temperatures are generally well below the lowest ambient temperatures to which the vehicle will be subject. Further advantageous properties are the relatively low boiling points, critical temperatures and critical pressures of these fluids compared with, for example, water. These properties permit the fluids to efficiently use engine heat with relatively lightweight equipment and small volumes of fluid.

Another desirable property of the refrigerant fluids is their ability to be condensed under moderate pressure at the ambient temperatures of the atmosphere.

Among the refrigerant fluids, those containing various chemical combinations of carbon, chlorine and fluorine and generally sold under the trademark "Freon" are particularly suitable. These fluids have advantages over other refrigerant fluids in that they are generally either less toxic, less corrosive or less combustible. The preferred choice among the various "Freon" gases is Dichlorodifluoromethane, sold under the trademark "Freon 12." This fluid possesses desirable thermal properties and is readily available at a low cost. In the brake system of the present invention the "Freon 12" could be heated, for example, to a temperature of 300° to 450° F under a pressure of 500–600 p.s.i.a. This high energy fluid then would be expanded in the brake motor and reduced to a pressure of about 170 p.s.i.a. and a temperature of about 120° F for condensing.

For a more detailed discussion of the use of "Freon" as a working fluid, reference is made to U.S. Pat. No. 2,301,404 issued to Bradford B. Holmes.

STRUCTURAL DETAILS OF THE FEED PUMP

Figure 2:
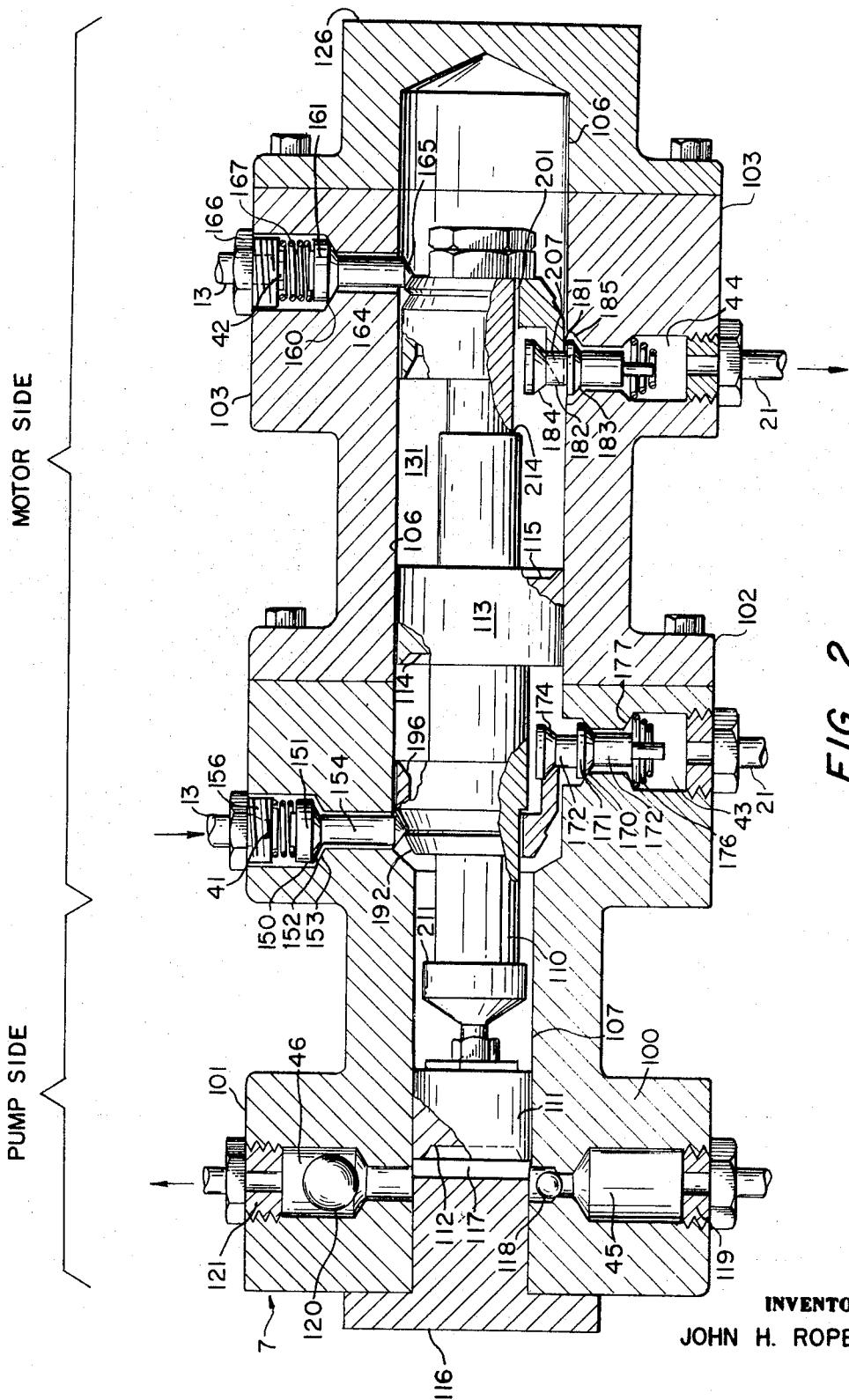
FIG. 2 is an enlarged cross-sectional side view of the feed pump schematically shown in FIG. 1, illustrating the reciprocating components in one extreme end position.
Figure 3:
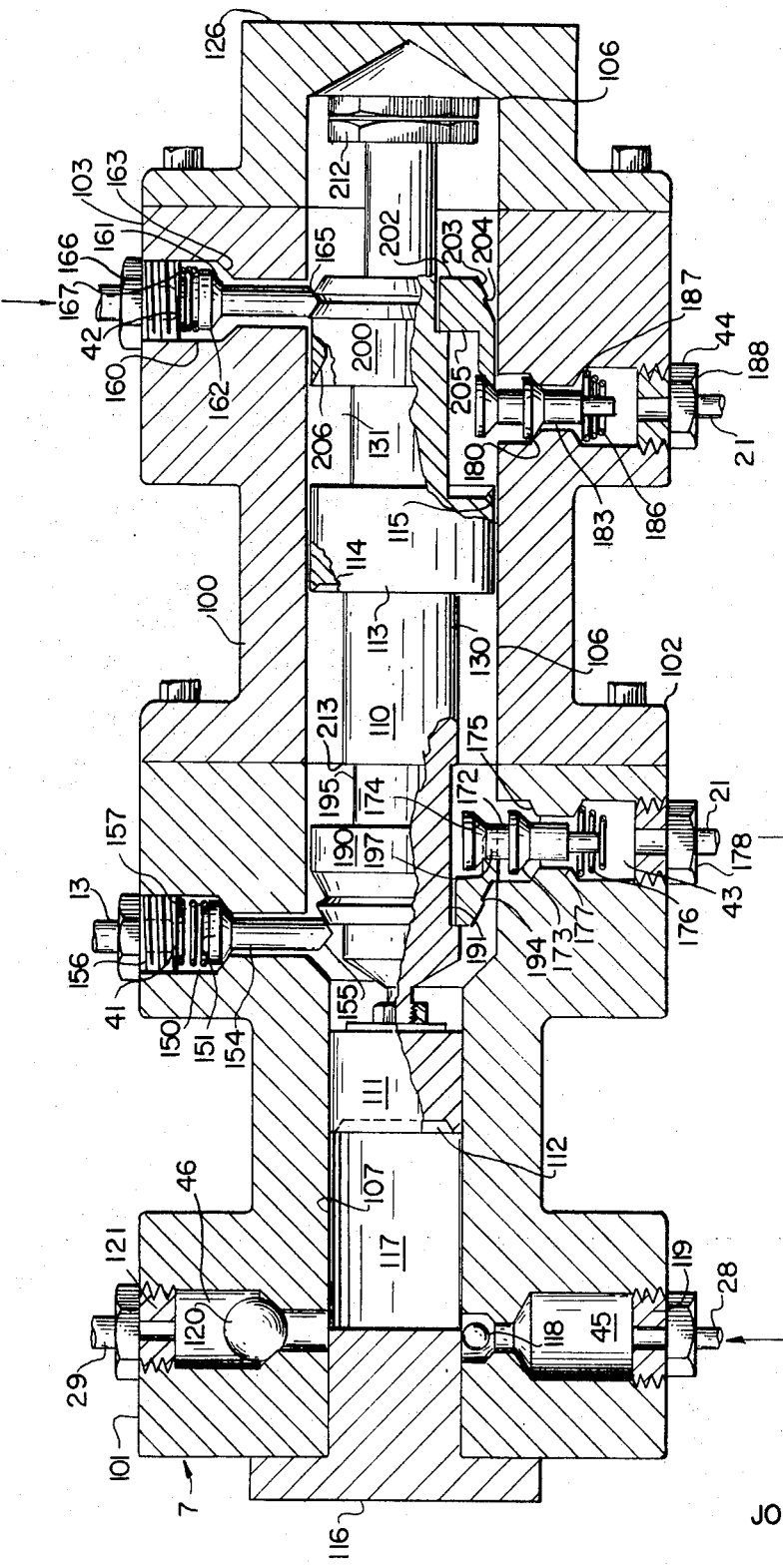
FIG. 3 provides a further enlarged cross-sectional side view of the FIG. 1 feed pump, illustrating the reciprocating components in the opposite extreme end position to that is shown in FIG. 2.
Figure 4:
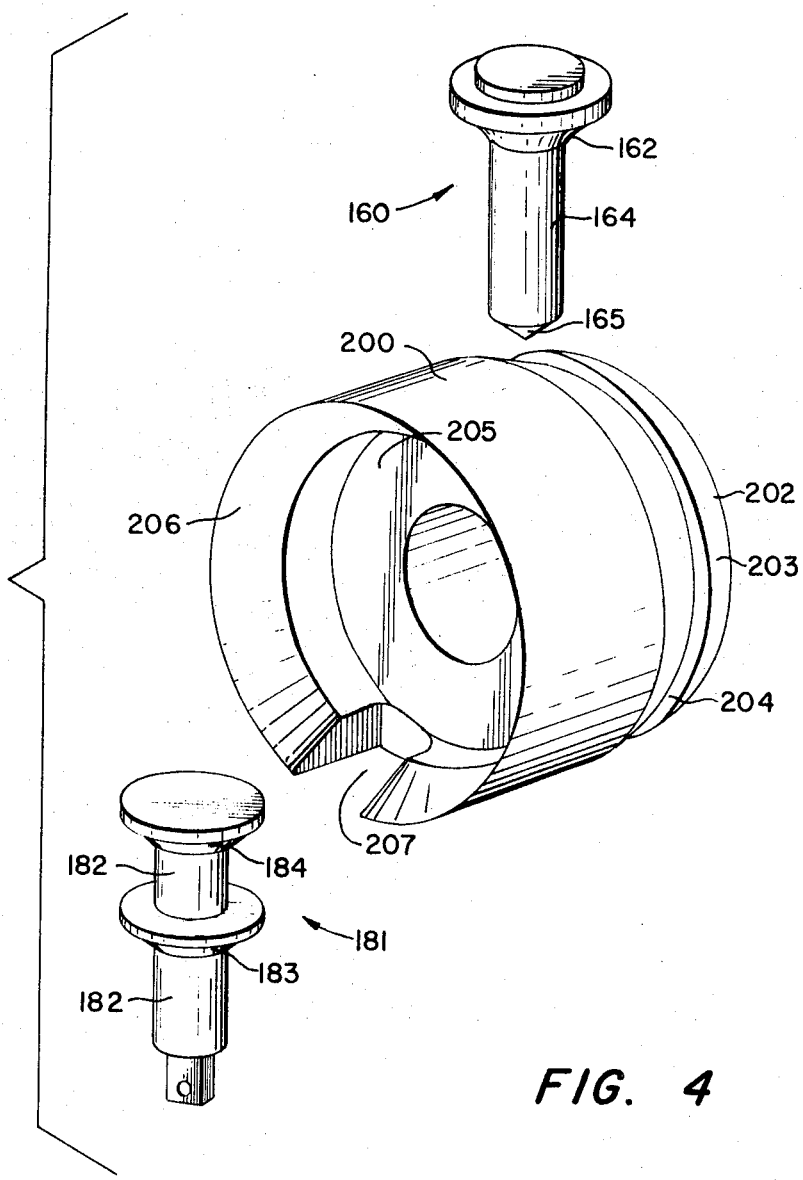
FIG. 4 is an isometric view of one of the sets of cam members and associated valve members shown in FIGS. 2 and 3.

The structural details of the feed pump 7 are shown in FIGS. 2, 3, and 4. As there illustrated, a pump housing 100 has three annular projections: a left annular projection 101, a central annular projection 102 and a right annular projection 103. As indicated in FIG. 2, the feed pump 7 has a pump side, which includes the left annular projection 101 and extends from this projection to the central annular projection 102, the feed pump 7 also has a motor side which includes central annular projection 102 and the right annular projection 103 and which further includes the area of the housing extending therebetween. The end of the feed pump 7, terminating on the pump side and shown at the extreme left of FIGS. 2 and 3, will hereinafter be referred to as the pump end. The other end, terminating on the motor side and shown at the extreme right of FIGS. 2 and 3 will be referred to as the motor end.

The housing 100 has a large diameter axial bore 106 extending through the motor side. A small diameter axial bore 107 extends through the pump side and is connected with the large diameter bore. An elongated rod 110 is disposed within bores 106 and 107. Affixed to that end of the rod 110 which terminates on the pump side is a plunger 111 which is axially slidable in the small diameter bore 107. The plunger 111 is preferrably coated with a synthetic resin polymer sold under the trademark "Teflon." The face of the plunger 111 nearest the pump end is designated as the working face 112 and has a generally concave or "cup-like" configuration.

A piston 113 is affixed to the rod 110 near the center thereof for axially slidable movement in the large diameter bore 106. This piston 113 has two mutually opposed working surfaces 114 and 115, each being of generally concave or "cup-like" configuration. The left working surface 114 faces the pump end and the right working surface 115 faces the motor end. Each of the working surfaces 114 and 115 are of substantially greater area than the working face 112 of the plunger 111.

At the pump end of the housing is an end plug 116 which closes the small diameter bore 107 to the exterior of the housing 100. The end plug 116, small diameter bore 107 and plunger 100 define a pump cylinder 117. Communicating with the pump cylinder 117 is a liquid inlet port 45 located in the left annular projection 101 of the housing 100. Associated with the liquid inlet port 45 is an inlet check valve 118. A fitting 119 connects the liquid inlet port 45 with the pump return line 28.

In similar fashion, a liquid outlet port 46, located in annular projection 101, communicates with the pump cylinder 117. The liquid outlet port 46 has an associated outlet check valve 120 and a fitting 121 for connection of the boiler feed line 29.

The housing 100 includes an end cover 126 located at the motor end. The large diameter bore 106 extends a short distance into the end cover 126 and terminates therein. Thus the end cover 126 is effective to seal off the large diameter bore 106 from the exterior of the housing 100.

The piston 113, divides the large diameter bore into two chambers, a left motor cylinder chamber 130 and a right motor cylinder chamber 131. Communicating with the left motor cylinder chamber 130 are a left gas inlet port 41 and a left gas exhaust port 43, these ports being located in the center annular projection 102. Similarly, a right gas inlet port 42 and a right gas exhaust port 44, located in the right annular projection 103, communicate with the right motor cylinder chamber 131.

Associated with the left gas inlet port 41 is a left inlet valve 150 having a moveable valve member 151. The inlet valve member 151 includes a seating surface 152 of frusto-conical configuration. This seating surface 152 mates with a frusto-conical valve seat 153 in the left gas inlet port 41. The inlet valve member 151 has a shank portion 154 extending radially inwardly from the seating surface 152 toward the left motor cylinder chamber 130. The shank portion 154 terminates in a head 155 of conical configuration. A fitting 156, diposed near the exterior of the housing 100 connects the gas inlet port 41 with the pressure branch 13. Interposed between the fitting 156 and the inlet valve member 151 is a compression coil spring 157 which biases the valve member 151 inwardly to a closed position wherein the seating surface 152 thereof contacts the valve seat 153.

The right gas inlet port 42 has a right inlet valve 160 which is substantially identical with gas inlet valve 150 just described. The right inlet valve 160 has a moveable inlet valve member 161 which includes a seating surface 162 which mates with a valve seat 163 in the right gas inlet port 42. A shank portion 164 of the inlet valve member 161 extends inwardly from the inlet seating surface and terminates in a conical, pointed head 165. A fitting 166 near the exterior of the housing 100 connects the gas inlet port 42 with the pressure branch 13. A compression coil spring 167 is interposed between the fitting 166 and the valve member 161 to bias the valve member 161, to the seated, closed position.

The left gas exhaust port 43, has associated therewith an exhaust valve 170. The valve includes a movable exhaust valve member 171, having a cylindrical shaft portion 172 and both a frusto-conical seating surface 173 and a frusto-conical cam follower surface 174 projecting radially outwardly therefrom. The seating surface 173 of the exhaust valve member 171 is biased to its closed position against a valve seat 175 in the gas exhaust port 43 by a conical coil spring 176. The spring 176 is held in compression between one end of the valve member 171 and a lip 177 in the gas exhaust port 43. A fitting 178 connects the left gas exhaust port 43 with the return conduit 21.

The right gas exhaust port 44 has associated therewith a right exhaust valve 180 which is substantially identical with the left exhaust valve described above. The right exhaust valve includes a moveable exhaust valve member 181 having a frusto-conical seating surface 183 and a frusto-conical cam follower surface 184 projecting radially outwardly from a cylindrical shaft portion 182.

Within the right gas exhaust port 44 is a valve seat 185 and a lip 187, the lip receiving the large end of a conical coil spring 186. The other end of the spring 186, is attached to one end of the exhaust valve member 181 to bias the exhaust valve member 181 into a position wherein the seating surface 183 thereof abuts the valve seat 185. A fitting 188 connects the right gas inlet port 44 with the return conduit 21.

Disposed in the left motor cylinder chamber 130 is a left cam member 190 which has a generally annular configuration. The left cam member 190 is co-axial with both the large diameter bore 106 and the rod 110 and is disposed in the annular space therebetween. A small annular clearance 191 exists between the cam member 190 and the rod 110.

The exterior portion of the left cam member 190 includes an annular exterior front surface 192, which is disposed perpendicularly to the axis of the bore 106 and which faces the pump end of the housing 100. Co-axial with the exterior front surface 192 and joining the outermost periphery thereof, is an annular, exterior cam surface 193, which is inclined radially outwardly in a direction away from the pump end of the housing 100. Adjacent that portion of the exterior cam surface 193 which is furthest from both the exterior front surface 192 and the axis of the housing 100 is an annular detent groove 194 which is open to the exterior of the left cam member 190.

The left cam member 190 includes an annular, interior rear surface 195 disposed co-axially with, and parallel to the exterior front surface 192. The left cam member 190 further includes an annular, interior cam surface 196 which is inclined radially outwardly in a direction away from the pump end of the housing 100. The interior cam surface 196 is disposed radially outside the interior rear surface 195. Both the interior rear surface 195 and the interior cam surface 196 face the pump end of the housing 100.

A slot 197, extending radially through the left cam member 190 and thus opening the interior thereof to the exterior, intersects the interior cam surface 196.

The left cam member 190 is disposed in the large diameter bore 106 for co-operation with the left inlet and exhaust valve members 150 and 170. The exterior cam surface 193 and detent groove 194 co-operate with the head 155 of the left inlet valve member 151, the interior cam surface 196 co-operates with the cam follower surface 174 and the slot 197 co-operates with the shaft portion 172 of the left exhaust valve member 171.

A right cam member 200 of generally annular configuration is disposed in the right motor cylinder chamber 131. The right cam member 200 is substantially identical to the left cam member 190 but faces in the opposite direction. Thus the two cam members 190 and 200 are disposed in mutually opposed relationship in their respective motor cylinder chambers 130 and 131.

The right cam member 200 is disposed in the annular space between the rod 110 and the large diameter bore 106. A small annular clearance 201 exists between the cam member 200 and the rod 110. The right cam member 200 has an exterior front surface 202 and an annular, exterior cam surface 203. The exterior cam surface 203 begins at the outermost periphery of the exterior front surface 202 and slopes radially outwardly in a direction away from the motor end of the housing 100. Both the exterior front surface 202 and the exterior cam surface 203 face the motor end of the housing 100. An annular detent groove 204 is disposed adjacent the outermost periphery of the exterior cam surface 203, the detent groove 204 being open to the exterior of the right cam member 200.

The interior portion of the right cam member 200 includes an interior rear surface 205 and an interior cam surface 206, both of which face the pump end of the housing 100. The interior cam surface 206 is disposed radially outside in the interior rear surface 205 and is inclined radially outwardly in a direction away from the motor end of the housing 100.

A slot 207 intersects the interior cam surface 206 while extending radially through the cam member 200 and thus opening the interior thereof to the exterior.

The right cam member 200 is disposed in the large diameter bore 106 for co-operation with the right inlet and exhaust valve members 150 and 170. The exterior cam surface 203 and detent groove 204 co-operates with the head 165 of the right inlet valve member 161, the interior cam surface 203 co-operates with the cam follower surface 184 of the right exhaust valve member 181 and slot 207 in the cam member 200 cooperates with the shaft portion 182 of the right exhaust valve member 181.

The disposition of the slot 207 in the right cam member 200 and its relationship with the right exhaust valve member 181 is best seen in the exploded view of FIG. 4. It is to be noted that the structures of and the interrelationships between the left cam member 190 and left inlet and exhaust valve members 150, 170 are substantially the same as those of the right cam and valve members 200, 161, 181 illustrated in FIG. 4.

The rod 110 has a series of annular shoulders formed thereon, which shoulders will engage various surfaces of the cam members 190, 200 at different times during the travel of the rod 110 in the bores 106, 107.

A left outer shoulder 211 is located on the rod in the vicinity of that end of the rod 110 which terminates on the pump side of the housing 100. This left outer shoulder 211 is of sufficient diameter to abut with the exterior front surface 192 of the left cam member 190 as the rod moves into the end position closest to the motor end of the housing 100 (FIG. 3).

Similarly, a right outer shoulder 212 is located on the rod in the vicinity of that end which terminates on the motor side of the housing 100. This right outer shoulder 212 is of sufficient diameter to abut with the exterior front surface 202 of the right cam member 200, when the rod 110 is near the end position closest to the pump end of the housing 100 (FIG. 2).

A left inner shoulder 213 is located on the rod between the left outer shoulder 211 and the piston 113. Likewise, a right inner shoulder 214 is located on the rod 110 between the right outer shoulder 212 and the piston 113. The left and right inner shoulders 213 and 214 are at such axial locations on the rod, and are of such dimensions, that they will abut either the left or right interior rear surfaces 195 and 205 respectively, when the rod 110 is near its end positions.

OPERATION OF THE FEED PUMP

The operation of the feed pump 7 will now be described. As mentioned above, the feed pump 7 is a totally enclosed unit which is driven by heated vapor from the system. Both the pump driving apparatus and the pumping apparatus per se are enclosed in the housing 100.

FIG. 2 shows the positioning of the various components of the feed pump 7 after the completion of the pressure stroke, whereby a charge of working fluid in the liquid phase has been delivered through the outlet check valve 120, of the liquid outlet port 46, and into the boiler feed line 29.

The left inlet valve has been opened by the action of the left cam member 190, so that heated vapor from the pressure branch 13 may flow through the left gas inlet port 41, past the left inlet valve 190 and into the left motor cylinder chamber 130. The heated vapor expands in the left motor cylinder chamber and impinges on the left working surface 114 of the piston 113 to force the piston 113 and the attached rod to the right.

As the plunger 111 starts the suction stroke and begins to move to the right along with the rod 110, the outlet check valve 120 closes and the inlet check valve 118 opens. Further movement of the plunger 111 to the right draws liquid working fluid through the liquid inlet port 45, past the inlet check valve 118 and into the pump cylinder 117.

While the rod 110 is moving to the right, expanded vapors lingering in the right motor cylinder, from the previous pressure stroke, are forced out through the right exhaust valve 180 by the action of the right working surface 115 of the piston 113.

As the rod 110 and piston 113 continue their movement through the suction stroke, they approach the extreme right end position, this position being illustrated in FIG. 3. Shortly before this position is reached, however, the left outer shoulder 211 of the rod 110 engages the exterior front surface 192 of the left cam member 190. At the same time the right inner shoulder 214 of the rod 110 engages the interior rear surface 205 of the right cam member 200.

After the cam members 190 and 200 have been engaged by the shoulders 211 and 214, the rod 110 moves further to the right and into the extreme end position shown in FIG. 3. During this latter movement, the cam members 190 and 200 move a short distance to the right along with the rod 110 and change their position from that shown in FIG. 2 to that shown in FIG. 3.

As the left cam member 190 begins its short movement to the right, the head 155 of the valve member 151, which had been locked in the detent groove 194 of the cam member 190 (see FIG. 2), is pushed from the groove 194 and into contact with the exterior cam surface 193. Further movement of the cam member 190 to the right causes the head 155 thereof to descend the inclined exterior cam surface 193 permitting the left inlet valve member 154 to move radially inwardly under the bias of the coil spring 157.

While the left cam member 190 is acting to close the left inlet valve 150, it is also acting to open the left exhaust valve 170. Initial movement of the cam member 190 to the right causes the cam follower surface 174 of the exhaust valve member 171 to engage the inclined, interior cam surface 196. Further movement of the cam member 190 to the right causes the left exhaust valve member 171 to ascend the inclined interior cam surface whereby the seating surface 173 of the exhaust valve member 171 is lifted from the valve seat 175 against the bias of the coil spring 176 to open the exhaust valve 170.

While the cam member 190 is moving to the right and the cam follower surface 174 of the exhaust valve member 171 is moving up the inclined interior cam surface 196, the shaft portion 172 of the exhaust valve member 171 moves into the open space designed by the slot 197 in the cam member 190. Thus interference between shaft portion 172 and the cam member 190 is avoided.

When the left cam member 190 reaches its extreme right position as shown in FIG. 3, the exhaust valve 170 will be fully open so that the expanded vapor in left motor cylinder chamber 130 may flow past the exhaust valve 170, through the left gas exhaust port 44 and into the return conduit 21.

At the same time as the above described actuation of the left inlet and exhaust valves 150, 170 by the left cam member 190 is taking place, the right cam member 200 is actuating its associated right inlet and exhaust valves 160, 180.

As mentioned above, the inner rear face 205 of the right cam member 200 is engaged by the right inner shoulder 214 of the rod 110, so that the cam member 200 will be pushed a short distance to the right. During this rightward movement, the exterior cam surface 203 of the cam member 200 engages the head 165 of the right inlet valve member 161 and causes the head 165 to ascend the inclined exterior cam surface 203. This effects a radially outward displacement of valve member 161 against the bias of the coil spring 165, to open the valve 160. As the right cam member 200 moves into its extreme right position, the head 165 of the valve member will be pushed into the detent groove 202 by the action of the coil spring 167. This will serve to hold the right inlet valve member 161 in its fully open position until completion of the next stroke.

While the inlet valve 160 is being opened by the right cam member 200, the exhaust valve is being closed thereby. Movement of the cam member 200 to the right, allows the cam follower surface 184 of the right exhaust valve member 181 to descend the inclined, interior cam surface 206 under the bias of the coil spring 186. The valve member 181 will move radially outwardly until its seating surface 183 abuts the valve seat 185, whereby the exhaust valve 180 will be closed. The combined forces, from the pressure of the heated vapor acting on the exhaust valve member 181 and from the inward bias of the coil spring 186, will hold the exhaust valve 180 in the closed position until the cam member 200 is moved from its present position at the end of the next stroke.

As both the rod 110 and the cam members 190 and 200 reach their extreme right positions, heated vapor begins to flow from the pressure branch 13, into the gas inlet port 42, past the newly opened inlet valve 160 and into the right motor cylinder chamber 131.

The heated vapor expands in the right motor cylinder chamber 131 and impinges on the right working surface 115 of the piston 113.

The force created on the piston 113 urges it to the left, initiating the pressure stroke. The rod 110 and plunger 111 move to the left with the piston, but the cam members 190, 200 remain stationary.

Movement of the plunger to the left effects pressurization of the liquid which had been drawn into the pump cylinder 117 on the suction stroke. The pressurization of the fluid will cause the inlet check valve 118 to close and the outlet check valve 120 to open. Pressurized liquid will then pass out of the pump cylinder 117, past the outlet check valve 120, through liquid outlet port 46 and into the boiler feed line 29.

As the piston 113 moves to the left, the expanded vapors remaining in the left motor cylinder chamber 130 from the previous stroke are pushed out through the newly opened left exhaust valve 170 and into the return conduit 21.

Shortly before the rod 110 completes its leftward movement and the plunger 111 nears the end of the pressure stroke, the left inner shoulder 123 engages the interior rear surface 195 of the left cam member 190 while the right outer shoulder 212 engages the exterior front surface 202 of the right cam member 200. After engaging the cam members 190 and 200, the rod 110 and cam members 190 and 200 move further to the left a short distance until the extreme left end position shown in FIG. 2 is reached.

As the left cam member 190 moves to the left, its exterior cam surface 193 engages the head 155 of the left valve member 151. Continued leftward movement of the cam member 190 causes the head 155 to ascend the inclined, exterior cam surface 193, effecting a radially outward movement of the left inlet valve member 151 against the bias of the coil spring 157.

When the left cam member 190 reaches its extreme left position, the head 155 of the valve member 151 will be pushed by the coil spring 157 into the detent groove 194 in the cam member 190. This will lock the inlet valve 150 in its open position until the completion of the next stroke.

While the left inlet valve 150 is being opened by the leftward movement of the left cam member 190, the left exhaust valve 170 is being closed thereby. The movement of the left cam member causes the cam follower surface 174 of the left exhaust valve member 171 to descend the inclined, interior cam surface 196, effecting a radially outward movement of the valve member 171 to close the valve 170. The movement of the exhaust valve member 171 toward the closed position is aided by the bias of the coil spring 176. When the cam member 190 reaches its extreme left position (FIG. 2) the exhaust valve 170 will be fully closed.

The leftward movement of the right cam member 200 effects a closing of the right inlet valve 160 and an opening of the right exhaust valve 180.

As the right cam member 200 begins its movement to the left, the head 165 of the right inlet valve member 161 will ride up and out of the detent groove 204 to release the valve member 161 from its locked open position. As the cam member 200 moves further to the left, the head 165 of the valve member 161 descends the exterior cam surface 203, effecting a radially inward movement of the valve member 161 to close the valve 160.

While the right cam member 200 is moving to the left and closing the right inlet valve 160, it is simultaneously opening the right exhaust valve 180. The leftward movement of the cam member 200 causes the cam follower surface 184 of the valve member 181 to ascend the inclined, interior cam surface 206 of the cam member 200. The valve member 181 moves radially inwardly against the bias of the coil spring 186 and the seating surface 183 is lifted from the seat 185 to open the exhaust valve 180. The slot 207 in the cam member 200 prevents interference of the cam member 200 with the shaft portion 182 of the valve member as the former moves to the left.

With the right inlet valve 160 now closed and the right exhaust valve 180 now open, flow of heated vapor to the right motor cylinder chamber 131 is cut off, and flow of expanded vapor therefrom begins. At the same time flow of heated vapor through the now open left inlet valve 150 and into the left motor cylinder chamber 130 begins and the piston 113, rod 110 and plunger are ready to begin their reverse movement to the right, to repeat the suction stroke.

From this point on the above described cycle will be repeated as long as the supply of heated vapor to the pump is maintained.

It will be understood that the plunger 111 is driven through its pumping stroke by the net leftward force resulting from the difference between the areas of the working surfaces of the piston 113 and plunger 111. Since the pressures in both the pump cylinder 117 and the right motor cylinder chamber 131 are approximately the same during the pumping stroke (about 600 p.s.i.a.), and since the effective area of the right working surface 115 of the piston 113 is substantially greater than the effective area of the plunger 111, the net leftward force will be the force of this pressure acting on a surface area equal to the difference of the two areas.

Both the plunger and piston are coated with polytetrafluoroethylene, a synthetic resin polymer sold under the trademark "Teflon." The generally concave or "cup-shaped" design of the working surfaces 112, 114 and 115 allows the force of the fluid to press the "Teflon" against the walls of the cylinders. This creates a fluid tight seal between the working surfaces 112, 114 and 115 and the walls of the associated cylinders.

The primary reason for using the "Teflon" coating on the piston 113 and plunger 11 is that this will eliminate the need for lubrication of the feed pump. "Teflon" has a low friction factor and is chemically stable when subjected to high temperature "Freon" fluid. The low friction characteristics of "Teflon" permit the piston 113 and plunger 111 to slide freely in their respective cylinders without lubrication.

The construction of the valve members 151, 161, 171 and 181 and the cam members 190 and 200 is such that there will be very little sliding contact between the individual elements. This reduces friction to a minimum and eliminates the need for lubrication of these parts.

It is to be noted that clearances 191 and 201 exist between the rod 110 and the cam members 190 and 200 respectively. Thus the rod 110 is supported in the housing 100 only by the "Teflon" coated piston 113 and plunger 111. Therefore, no friction is generated between the rod 110 and cam members 190, 200 as the rod reciprocates.

Thus it will be seen that the present invention provides a feed pump which requires no lubrication, which is driven by working fluid, and which contains both the pumping apparatus and the pump driving apparatus in a single totally enclosed housing.

SCOPE OF THE INVENTION

In describing the system and feed pump of the present invention, reference has been made to a preferred embodiment, but various other embodiments and modifications are possible within the scope of the invention. For example, a dual circuit brake system as known in the art may be used in place of the single brake system described above. Also, the system of the present invention may be used to drive automotive components other than brakes, for example, air conditioners or alternators.

It will be apparent to those skilled in the art that other variations, modifications and changes may be made without departing from the scope of the invention as defined in the appended claims.

I claim:
1. A thermally activated power system comprising:
   a. means for vaporizing a working fluid with heat;
   b. a brake motor wherein the vaporized working fluid is expanded to produce mechanical power, said motor communicating with said vaporizing means;
   c. a vehicle brake operatively connected with said brake motor for receiving mechanical power therefrom;
   d. a condenser for liquifying the working fluid after it has been expanded in said motor, said condenser communicating with said motor;
   e. a feed pump for moving and pressurizing the working fluid which has been liquified in said condenser, said feed pump communicating with said vaporizing means and said condenser;
   f. said feed pump having a housing with a first end and a second end;
   g. said housing having a first bore portion therein, one end of said first bore being disposed in the vacinity of said first end of said housing;
   h. said housing having a second bore portion therein, one end of said second bore being disposed in the vacinity of said second end of said housing, said first and second bores joining each other at a point remote from said first and second ends of said housing;
   i. said feed pump having an elongated rod disposed in said first and second bores and axially movable therein;
   j. said rod having a plunger attached thereto at the end of said rod nearest said first end of said housing, said plunger being disposed in said first bore and being axially movable therein;
   k. said rod having a piston attached thereto in spaced apart relation with said plunger, said piston being disposed in said second bore and being axially movable therein;
   l. said feed pump having an inlet valve means in said housing, said inlet valve means being associated with said second bore for controlling flow into said second bore; and
   m. said feed pump having a cam means in said second bore, said cam means co-operating with said inlet valve means and said exhaust valve means, said cam means being adapted for movement with said rod, the movement of said cam means being effective to actuate said inlet valve means and said exhaust valve means.

2. A thermally activated power system as recited in claim 1, wherein said vaporizing means includes:
   a. a heat exhange means for conducting heat from the exhaust gases of an engine of a vehicle to said working fluid to vaporize the working fluid;
   b. a means for directing exhaust gases of an engine of a vehicle to said heat exhange means.

3. A thermally activated power system as recited in claim 2 further comprising:
   a. a brake valve communicating with said heat exchange means, said motor and said condenser, said brake valve controlling the flow of working fluid from said heat exchange means to said motor and from said motor to said condenser;
   b. a reservoir for collecting the working fluid, said reservoir communicating with said heat exchange means and said control valve.

4. A thermally activated power system as recited in claim 1, having a working fluid which circulates therethrough, said working fluid comprising carbon, chlorine and fluorine in chemical combination.

5. A thermally activated power brake system comprising:
   a. means for vaporizing a working fluid;
   b. a brake motor wherein the vaporized working fluid is expanded to produce mechanical braking power, said brake motor communicating with said vaporizing means;
   c. a vehicle brake operatively connected with said brake motor for receiving mechanical braking power therefrom;
   d. a condenser for liquefying the working fluid after it has been expanded in said brake motor, said condenser communicating with said brake motor; and
   e. a feed pump for moving and pressurizing the working fluid which has been liquified in said condenser, said feed pump communicating with said vaporizing means and said condenser.

6. A thermally activated power brake system as recited in claim 5, having a working fluid which circulates therethrough, said working fluid comprising carbon, chlorine and fluorine in chemical combination.

7. A thermally activated power brake system as recited in claim 6, wherein the working fluid is dichlorodifluoromethane.

8. A thermally activated power brake system as recited in claim 5, wherein said vaporizing means includes:
   a. a heat exchange means for conducting heat from the exhaust gases of an engine of a vehicle to said working fluid to vaporize said working fluid;
   b. a means for directing exhaust gases of an engine of a vehicle to said heat exchange means.

9. A thermally activated power brake system as recited in claim 8, wherein said heat exchange means is a coil of tubing.

10. A thermally activated power brake system as recited in claim 8, further comprising a brake valve communicating with said heat exchange means, said vehicle brake and said condenser, said brake valve controlling the flow of said working fluid from said heat exchange means to said vehicle brake and from said vehicle brake to said condenser.

11. A thermally activated power brake system as recited in claim 10, further comprising:
   a. a foot pedal connected with said brake valve for actuating said brake valve;
   b. a reservoir communicating with said heat exchange means and said brake valve for collecting said working fluid.

12. A thermally activated power brake system as recited in claim 5, wherein said vehicle brake is a disc brake.

* * * * *